(12) United States Patent
Hatori (10) Patent No.: US 8,625,175 B2
(45) Date of Patent: Jan. 7, 2014

(54) IMAGE PROCESSING FOR CORRECTION OF COLORIMETRIC VALUES BASED ON TEMPERATURE

(75) Inventor: Kazushige Hatori, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 13/141,641

(22) PCT Filed: Feb. 25, 2010

(86) PCT No.: PCT/JP2010/053475
§ 371 (c)(1),
(2), (4) Date: Jun. 22, 2011

(87) PCT Pub. No.: WO2010/103983
PCT Pub. Date: Sep. 16, 2010

(65) Prior Publication Data
US 2011/0255105 A1    Oct. 20, 2011

(30) Foreign Application Priority Data

Mar. 11, 2009    (JP) .................................. 2009-058696

(51) Int. Cl.
*H04N 1/46* (2006.01)

(52) U.S. Cl.
USPC .............................. 358/504; 358/1.9; 358/518

(58) Field of Classification Search
None
See application file for complete search history.

(56) References Cited

U.S. PATENT DOCUMENTS

| | | | |
|---|---|---|---|
| 5,740,079 A | 4/1998 | Shigemori et al. | 364/526 |
| 6,414,756 B1 * | 7/2002 | Tsukada | 358/1.9 |
| 6,717,672 B2 * | 4/2004 | Tamagawa | 356/402 |
| 7,684,082 B2 * | 3/2010 | Mestha et al. | 358/1.9 |
| 7,697,167 B2 | 4/2010 | Hatori | 358/2.1 |
| 7,864,320 B2 * | 1/2011 | Bonino et al. | 356/402 |
| 7,961,322 B2 * | 6/2011 | Skinner et al. | 356/402 |
| 8,035,859 B2 * | 10/2011 | Kusunoki | 358/3.01 |
| 8,044,965 B2 * | 10/2011 | Suzuki | 345/581 |
| 8,059,165 B2 * | 11/2011 | Ishii | 348/223.1 |
| 2002/0071120 A1 | 6/2002 | Tamagawa | 356/402 |
| 2004/0212816 A1 * | 10/2004 | Tanabe et al. | 358/1.9 |
| 2009/0225340 A1 | 9/2009 | Hatori | 358/1.9 |
| 2010/0053652 A1 | 3/2010 | Hatori et al. | 358/1.9 |
| 2010/0053653 A1 | 3/2010 | Hatori et al. | 358/1.9 |
| 2010/0086201 A1 | 4/2010 | Muto et al. | 382/162 |
| 2011/0149319 A1 | 6/2011 | Muto et al. | 358/1.9 |
| 2011/0164287 A1 | 7/2011 | Baba et al. | 358/3.24 |

FOREIGN PATENT DOCUMENTS

| | | |
|---|---|---|
| JP | 8-313353 | 11/1996 |
| JP | 9-184762 | 7/1997 |
| JP | 2000-88651 | 3/2000 |
| JP | 2002-139381 | 5/2002 |
| JP | 3555706 | 8/2004 |
| JP | 2010-88058 | 4/2010 |

* cited by examiner

*Primary Examiner* — Dung Tran
(74) *Attorney, Agent, or Firm* — Fitzpatrick, Cella, Harper & Scinto (57) ABSTRACT

The invention provides an image processing apparatus comprising: forming means for forming a patch based on patch data on a medium; temperature measuring means for measuring the temperature of a white paper portion of a medium to obtain a white paper temperature; colorimetry means for obtaining a colorimetric value by measuring the color of the patch formed on the medium; estimation means for estimating a colorimetry temperature, which is the temperature of the patch at the time when the colorimetry means measures its color, based on the patch data and the white paper temperature; and correction means for correcting the colorimetric value based on the estimated colorimetry temperature.

11 Claims, 11 Drawing Sheets

IMAGE PROCESSING FOR CORRECTION OF COLORIMETRIC VALUES BASED ON TEMPERATURE

TECHNICAL FIELD

The present invention relates to an image processing apparatus and a color processing method, and in particular relates to an image processing apparatus and a color processing method performing color processing that corrects the colorimetric value of a printed matter, which fluctuates depending on temperature.

BACKGROUND ART

Ordinarily, the colorimetric value of a colored material changes with temperature, and this phenomenon is known as "thermochromism". Thermochromism is a problem whenever a very precise colorimetry is desired, since the error due to the temperature of the object to be measured affects the colorimetric value.

Figure 10:
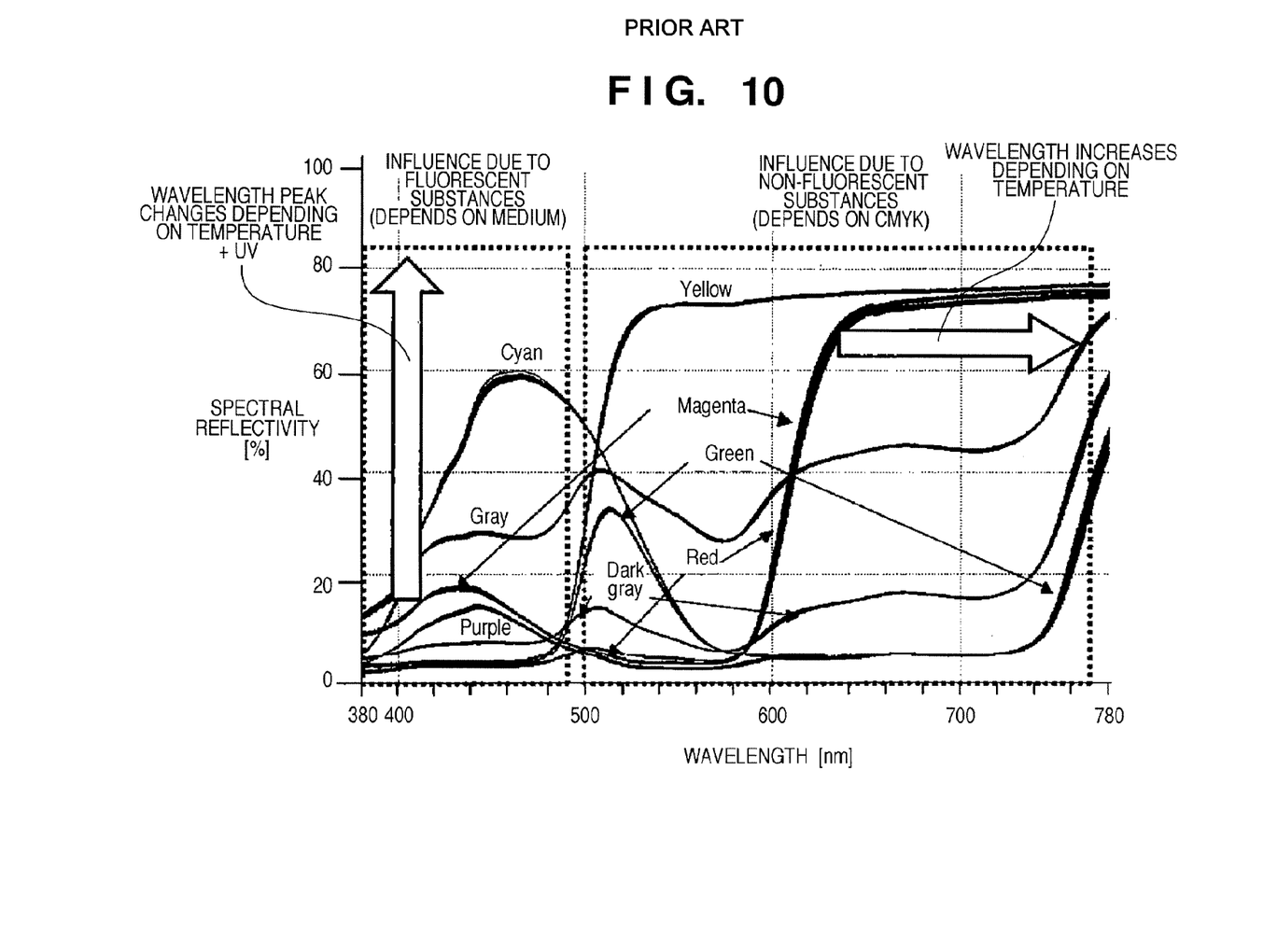
FIG. 10 is a graph illustrating the thermochromism phenomenon for spectral reflectivity for a typical patch.
Figure 11:
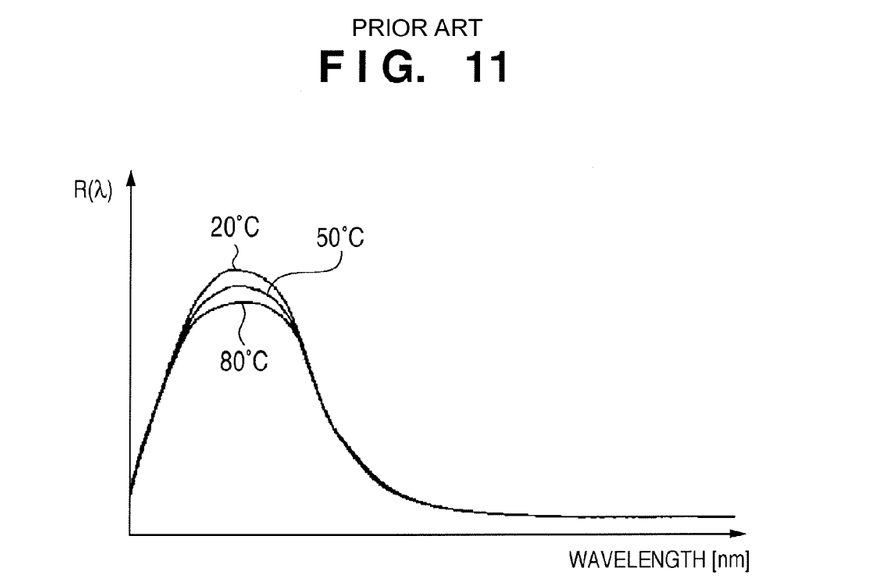
FIG. 11 is a graph showing the change of the spectral reflectivity due to temperature changes of a fluorescent substance.
Figure 12:
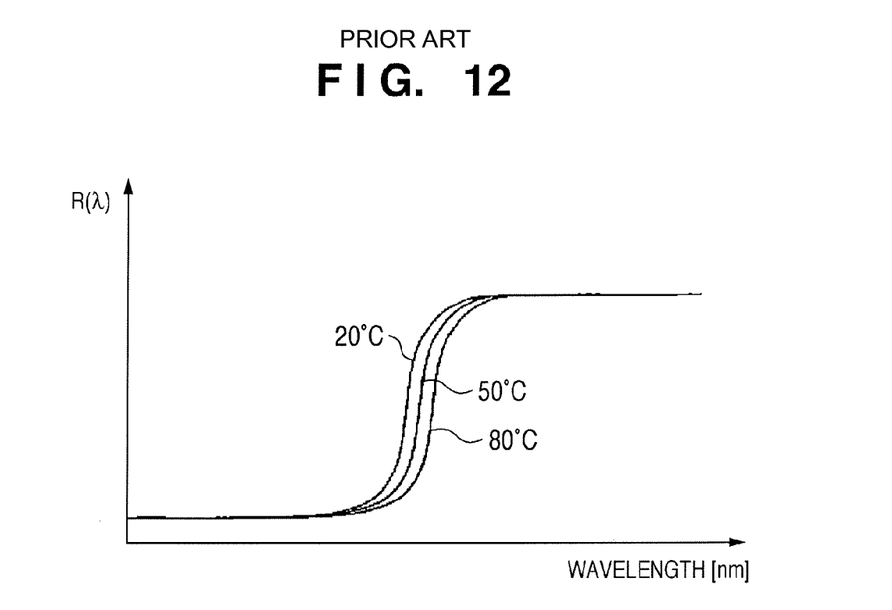
FIG. 12 is a graph showing the change of the spectral reflectivity due to temperature changes of a non-fluorescent substance.

It is known that the temperature variation caused by this error is substantially linear over temperature and is reversible. FIG. 10 shows the result of analyzing a color chart (referred to in the following as "patch") printed with an electrophotographic printer, by measuring its spectral reflectivity. As can be seen in FIG. 10, the color fluctuations can be classified into fluctuations caused by the influence of fluorescent substance, such as fluorescent brighteners contained in the media, and fluctuations caused by the influence of non-fluorescent substances, such as toner compositions. Furthermore, as shown in FIG. 11, the spectral reflectivity of fluorescent substances changes in the vertical direction of the chart depending on the temperature, and as shown in FIG. 12, the spectral reflectivity of non-fluorescent substances changes in the horizontal direction of the chart depending on the temperature.

In order to increase their whiteness, some media that are used for ordinary printing contain fluorescent brighteners that absorb UV light and exhibit fluorescence in the visible part of the spectrum. The fluorescent brightening effect due to the fluorescent brighteners depends on the temperature, that is, increases or decreases with the temperature, so that also the colorimetric value of the printed matter that is obtained by printing on the media containing the fluorescent brighteners will depend on and change with the temperature.

The following is an explanation of a color stabilization process and a color matching process performed by an ordinary printing apparatus. Conventionally, in order to output a desired color with a printing apparatus, such as an electrophotographic printer, a color conversion look-up table (referred to below as "LUT") is used. Among color conversion LUTs, there are LUTs used for a calibration in order to keep the printing apparatus in a given constant state and LUTs used for color matching, for which ICC profiles are a typical example. To prepare these color conversion LUTs, a plurality of color charts, such as IT8.7/3 patches or the like, are output with the printing apparatus. Using a colorimeter, such as a spectrophotometer, the colors of the plurality of color charts are measured, thus obtaining their colorimetric values, and by associating the device value with the device independent value, a color conversion LUT is prepared. By using the prepared LUT, differences in color among devices as well as differences in color due to variations among print engines can be reduced, and better color matching and color stabilization can be attained.

Recently, such LUTs are generated in real-time by using a color sensor mounted inside the electrophotographic printer. Such a printer detects, with the built-in color sensor, the patch immediately after fixing, and returns the colorimetric value of the patch to the LUT generation process.

However, in ordinary electrophotographic printers, patches that have just been is fixed are very hot (about 70 degrees Celsius), so that the colorimetric value of the patches changes due to the above-mentioned thermochromism. Therefore, there is the problem that a LUT that is suitable for the environment in which the user views the printed matter (room temperature) cannot be prepared with high precision.

Figure 13:
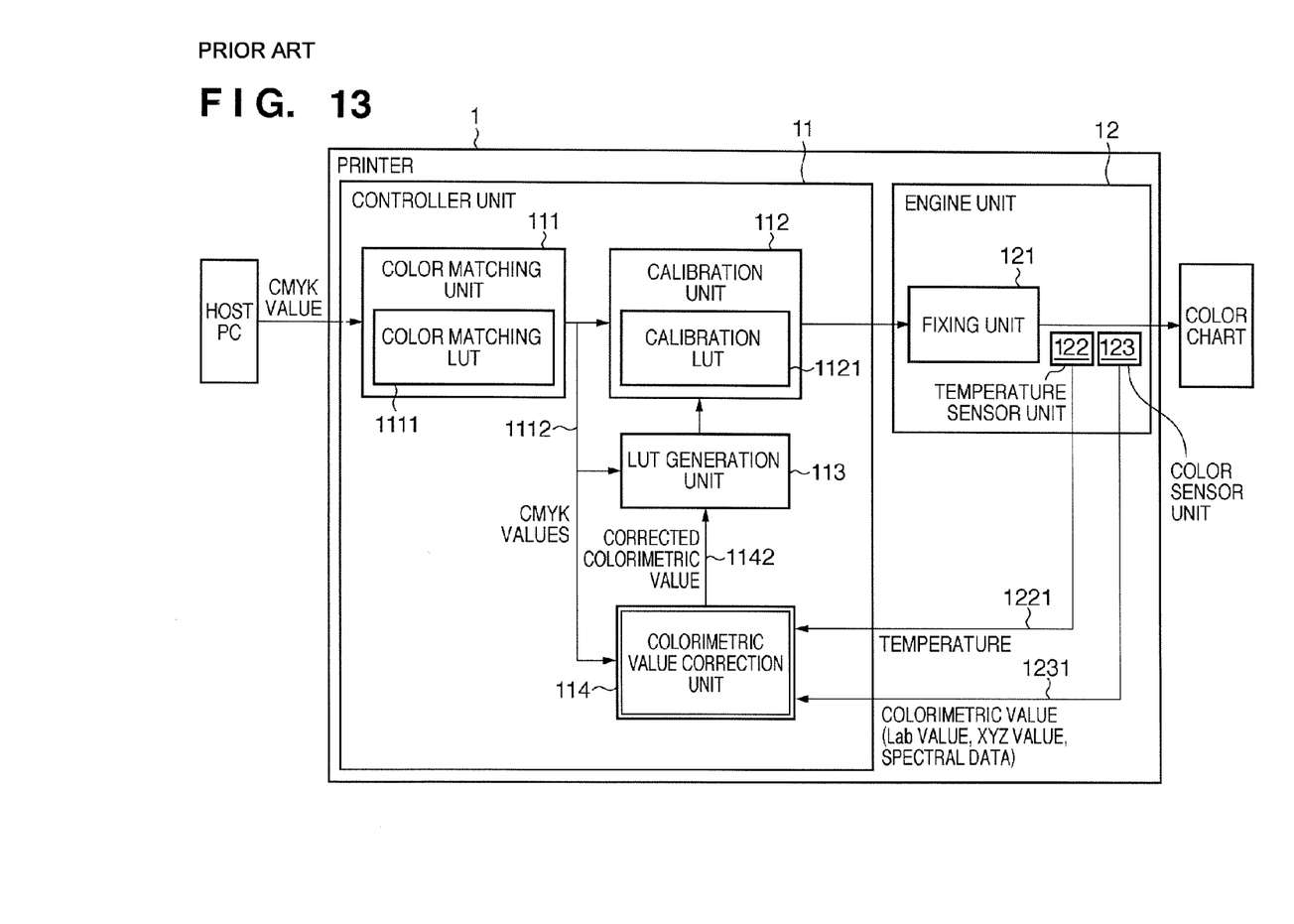
FIG. 13 is a block diagram showing the configuration of a printer performing a colorimetric value temperature correction according to the related art.

Consequently, there is a need for a technology in printing apparatuses to correct the colorimetric value in view of the temperature at the time of the colorimetry. For example, as shown in FIG. 13, printing apparatuses have been proposed, which prepare the LUT considering the media temperature immediately after the fixing of the patch (see Japanese Patent Number 3555706, for example). The printer 1 shown in FIG. 13 is characterized in that it generates colorimetric values for any desired temperature by performing a correction regarding temperature fluctuations to the colorimetric values of any patch printed on a medium (any color reproduced with the printer), using a colorimetric value correction unit 114.

Figure 14:
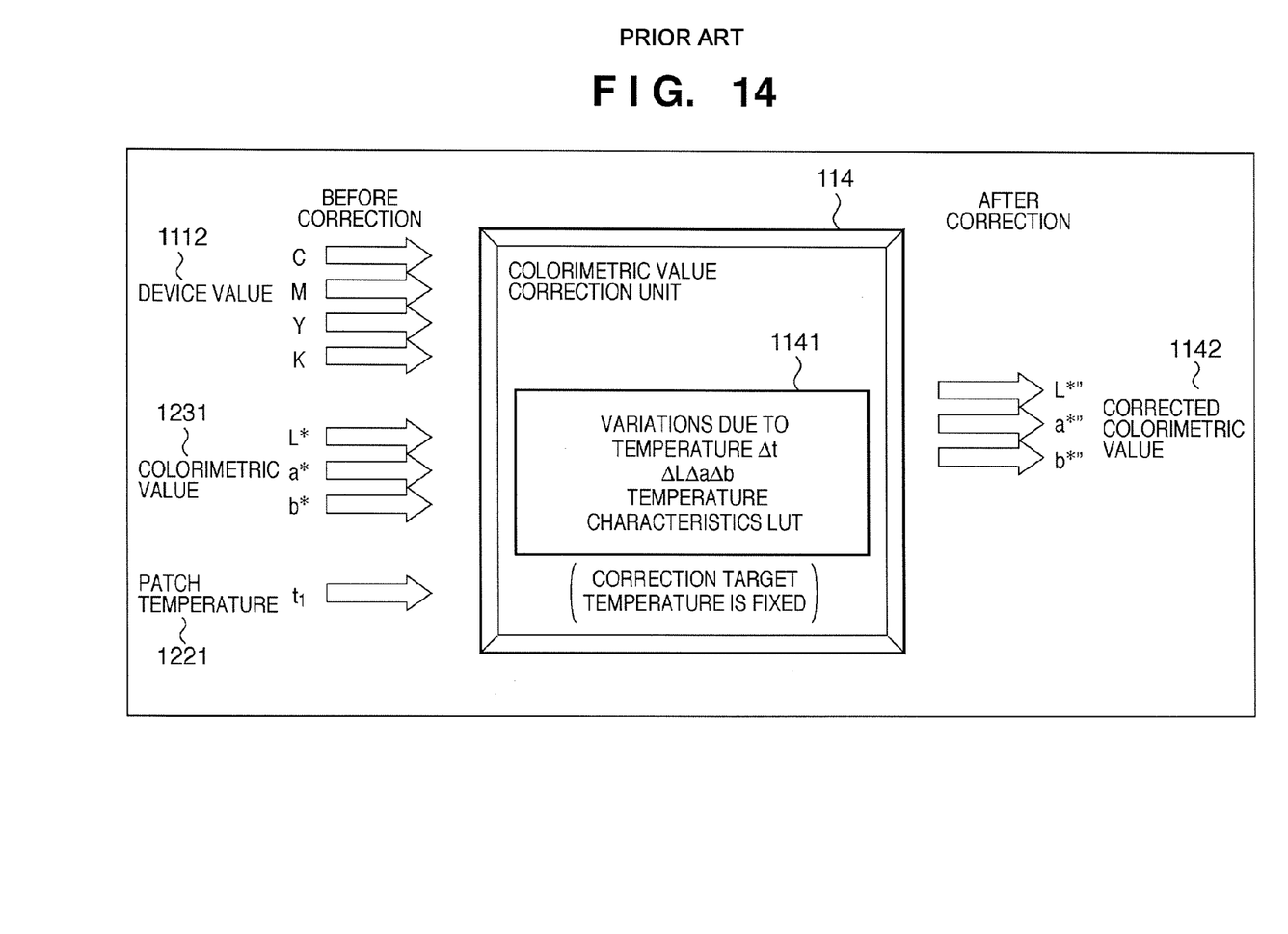
FIG. 14 is a diagram showing an outline of the operation of the colorimetric value temperature correction unit 9 according to the related art.

FIG. 14 shows an outline of the operation of the colorimetric value correction unit 114. As shown in this figure, the device value 1112 of the patch (patch data), whose color is to be measured, is entered from a color matching unit 111 into the colorimetric value correction unit 114. Furthermore, the patch temperature 1221 and the colorimetric value 1231, which are output from a temperature sensor unit and a color sensor unit within the engine, are entered into the colorimetric value correction unit 114. Then, using the specified object temperature and a temperature characteristics LUT 1141 of a reference patch that has been set in advance, the colorimetric value correction unit 114 corrects the colorimetric value and outputs the corrected colorimetric value 1142.

However, in ordinary electrophotographic printers, including the above-described conventional printers performing temperature-dependent correction of the colorimetric values, all patches keep a certain temperature immediately after fixing, but when the sheet paper has been transported for a certain distance after the patch has been fixed, the temperature differs from patch to patch. The reason for this is that the amount of toner differs from patch to patch, so that the specific heat differs from patch to patch and there are differences in the amount by which the temperature drops.

Therefore, in order to make the colorimetric value correction for the temperature of the patch more accurate, it is necessary to measure the temperature of the patch under test at the same time of colorimetry, for each colorimetric analysis using a radiation thermometer or the like on each patch to be measured, so that the system becomes more complicated and more expensive.

Thus, since the patch temperature immediately after fixing the patch changes, it is difficult to perform a suitable colorimetric value correction taking into account the patch temperature.

DISCLOSURE OF INVENTION

The present invention has been conceived in view of the above-noted problems and provides an image processing apparatus and a color correction method having the functionality of allowing a suitable correction of colorimetric values of patches by considering the temperature drop after forming the patch for patches of any color formed on a medium, and estimating the patch temperature.

An image processing apparatus according to the present invention has the following configuration.

Namely, an image processing apparatus according to the invention comprises: forming means for forming a patch based on patch data on a medium; temperature measuring means for measuring the temperature of a white paper portion of a medium to obtain a white paper temperature; colorimetry means for obtaining a colorimetric value by measuring the color of the patch formed on the medium; estimation means for estimating a colorimetry temperature, which is the temperature of the patch at the time when the colorimetry means measures its color, based on the patch data and the white paper temperature; and correction means for correcting the colorimetric value based on the estimated colorimetry temperature.

Further features of the present invention will become apparent from the following description of exemplary embodiments (with reference to the attached drawings).

BEST MODE FOR CARRYING OUT THE INVENTION

Referring to the accompanying drawings, the following is a detailed explanation of exemplary embodiments of the present invention. It should be noted that the configurations discussed in the following embodiments are merely examples, and that the present invention is not limited to the configurations shown in the figures.

First Embodiment

Apparatus Configuration

In the present embodiment, an example of performing a colorimetric value correction with an electrophotographic printer on which a color sensor is mounted is explained.

Figure 1:
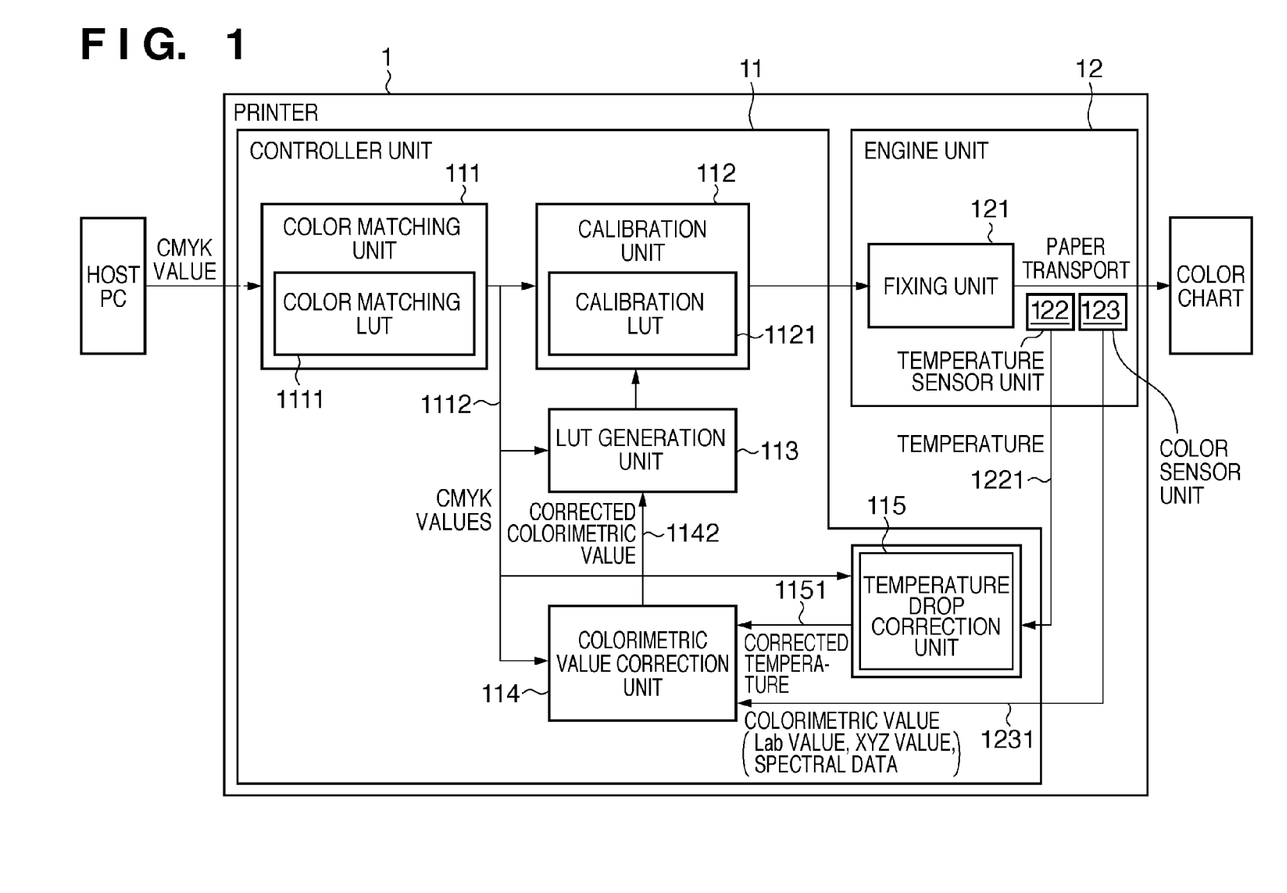
FIG. 1 is a block diagram showing the configuration of a printer according to an embodiment of the present invention, incorporating a temperature drop correction unit.

FIG. 1 is a block diagram showing the configuration of a printer according to the present embodiment. The printer 1 outputs a calibration patch before performing a print job or during performing a print job and measures its color (colorimetric value) using a built-in color sensor. Then, the printer 1 maintains color reproducibility by preparing and updating a correction table based on the colorimetric value.

The functional components of the printer 1 can be roughly categorized into a controller unit 11 and an engine unit 12. The controller unit 11 includes a color matching unit 111, a calibration unit 112, a LUT generation unit 113, a colorimetric value correction unit 114, and a temperature drop correction unit 115. It should be noted that the controller unit 11 includes further functional components relating to other image processing, but here, explanations not directly related to the present embodiment have been omitted.

The color matching unit 111 performs a color adjustment using a color matching LUT 1111, such as an ICC profile. The calibration unit 112 performs an image correction (calibration) for keeping a printing condition constant, using a calibration LUT 1121. That is to say, the CMYK values of the image data to be formed (device values) that are output from the color matching unit 111 are converted multidimensionally using the calibration LUT 1121, thus obtaining corrected CMYK values.

The temperature drop correction unit 115 generates a corrected temperature 1151 by correcting the temperature 1221 obtained from a temperature sensor unit 122 located in the engine unit 12, based on the device value (patch data) 1112 obtained from the color matching unit 111. This corrected temperature 1151 corresponds to the temperature at the time when the color of the patch based on the patch data is measured with the color sensor unit 123, and is the estimated patch colorimetry temperature.

Figure 3:
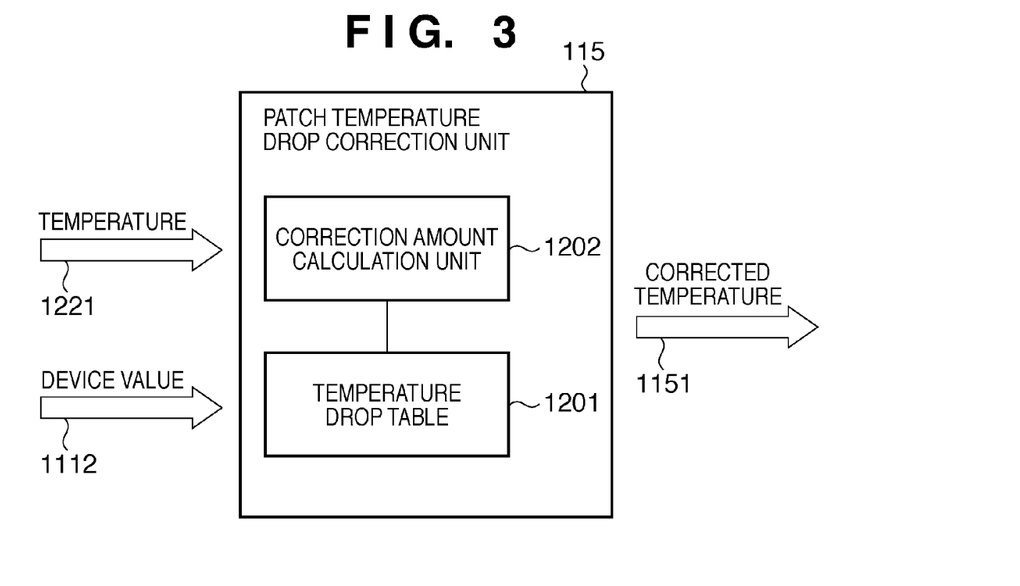
FIG. 3 is a block diagram illustrating a configuration example of the temperature drop correction unit according to this embodiment.

FIG. 3 shows an outline of the operation of the temperature drop correction unit 115. As shown in this figure, the temperature drop correction unit 115 includes a temperature drop table 1201 indicating the characteristics of the patch temperature drops, and a correction amount calculation unit 1202. In the temperature drop correction unit 115, the correction amount calculation unit 1202 calculates a correction amount by looking up the temperature drop table 1201, which has been prepared in advance. A method for preparing this temperature drop table 1201 is explained later.

The colorimetric value correction unit 114 estimates the patch colorimetric value at a predetermined desired temperature (object temperature) by correcting the patch colorimetric values with respect to temperature fluctuations, based on the patch colorimetry temperature estimated with the temperature drop correction unit 115.

Figure 2:
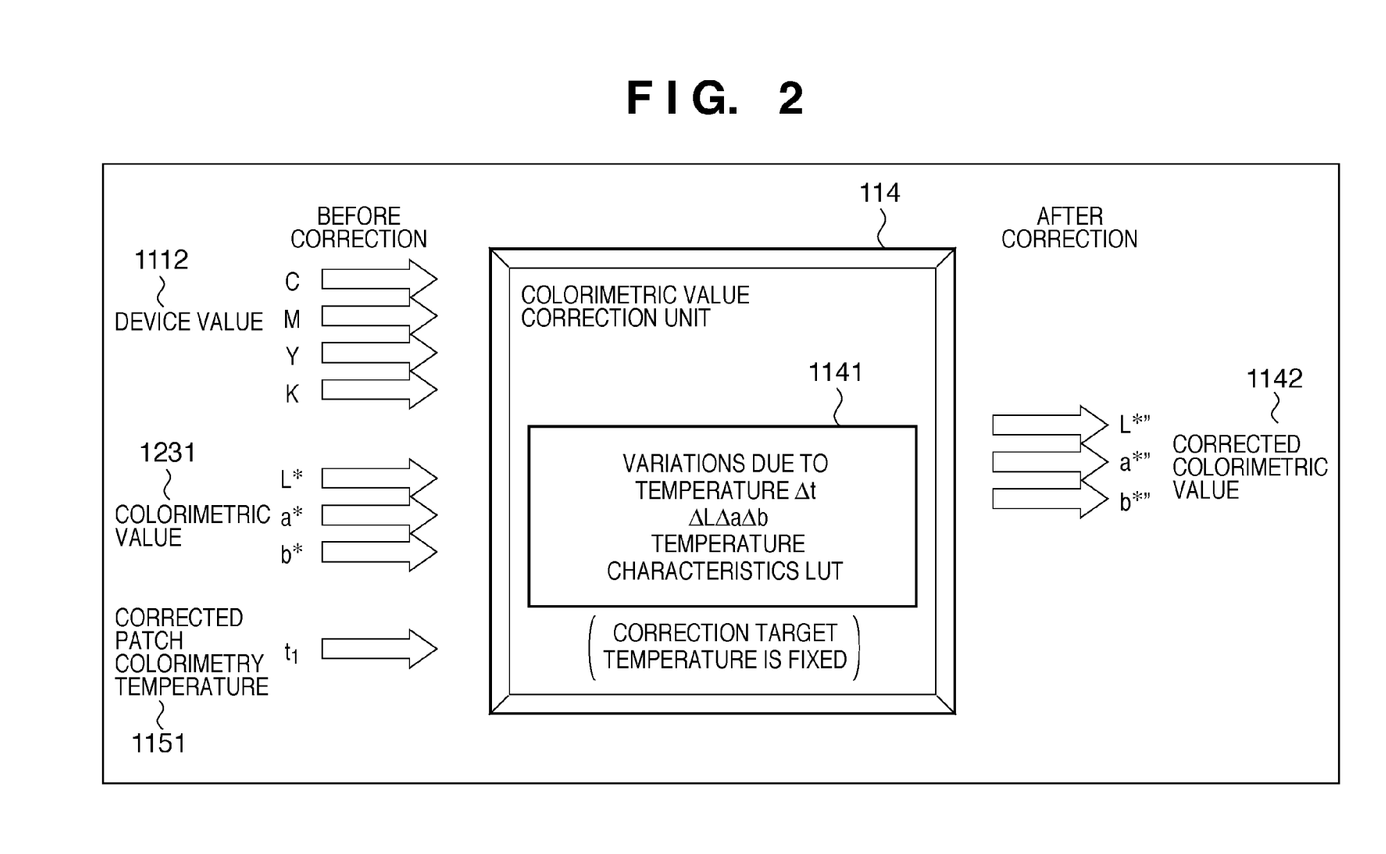
FIG. 2 is a diagram showing an outline of the operation of the colorimetric value correction unit in this embodiment.

FIG. 2 shows an overview of the operation of the colorimetric value correction unit 114. As shown in this figure, the device value 1112 from the color matching unit 111, the patch colorimetry temperature 1151 corrected with the temperature drop correction unit 115, and the colorimetric value 1231 from the color sensor unit 123 in the engine unit 12 are entered into the colorimetric value correction unit 114. Then, a correction of the colorimetric value is performed using the specified object temperature and the previously set temperature characteristics LUT 1141 of the reference patch, and the corrected colorimetric value 1142 is output.

It should be noted that in the present embodiment, the process for estimating the patch colorimetric value with the colorimetric value correction unit 114 can be performed in the same manner as in the above-discussed related art, so that a further detailed discussion thereof has been omitted.

The LUT generation unit 113 generates the calibration LUT 1121 in the calibration unit 112, using the corrected colorimetric value 1142 at the object temperature, which has been corrected by the colorimetric value correction unit 114.

On the other hand, the engine unit 12 includes a fixing unit 121, which fixes the patch formed on the medium by applying heat and pressure, a temperature sensor unit 122 that measures the temperature of the patch on the medium or the white portion of the paper, and a color sensor unit 123 that measures the color of the patch on the medium. It should be noted that the engine unit 12 includes further functional components for forming an image on a medium, but here, explanations not directly related to the present embodiment have been omitted.

The fixing unit 121 includes a combination of a roller and a belt and has a built-in heat source, such as a halogen heater. It melts the toner attached onto the medium by applying heat and pressure and fixes it thereto. The temperature sensor unit 122 and the color sensor unit 123 are arranged along the transport path from the fixing unit 121 to the ejection port, and respectively measure the temperature of the patch and the color value of the patch.

In the printer 1 according to the present embodiment, the temperature sensor unit 122 and the color sensor unit 123 are arranged at a predetermined distance from each other, and the temperature drop while the medium is transported between the sensors, immediately after the patch has been fixed to it, depends on the patch. In the present embodiment, the temperature drop correction unit 115 corrects the patch temperature measured with the temperature sensor unit 122 considering the temperature drop of the patch. In the following, first, a process for preparing the temperature drop table, which is necessary for correcting the temperature drop of the patch, is explained. Then, a process by which the printer 1 corrects the patch temperature drop using the temperature drop table is explained.

Process for Preparing Patch Temperature Drop Characteristics Table

Figure 4:
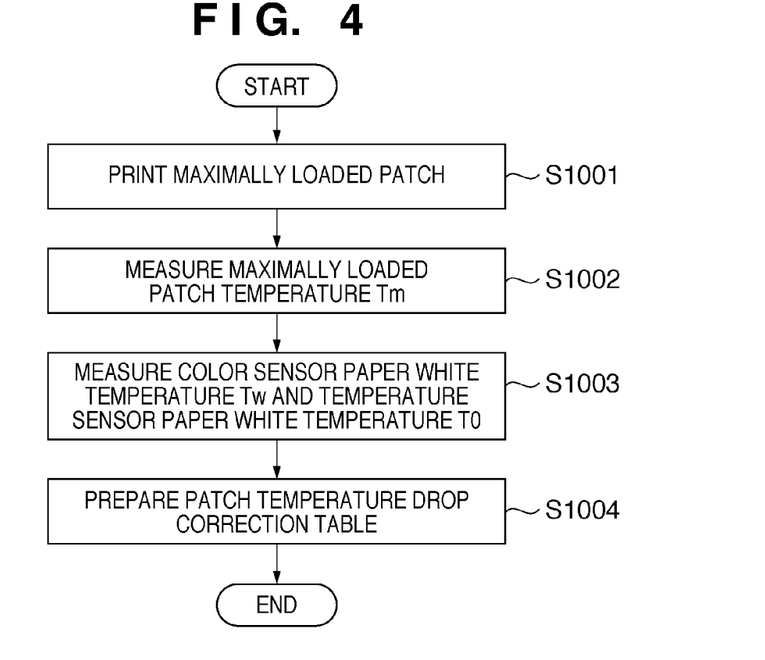
FIG. 4 is a flowchart showing the process of preparing the temperature drop characteristics table according to this embodiment.

Referring to the flowchart in FIG. 4, the following is an explanation of a process for preparing in advance the temperature drop table 1201, which is necessary for correcting the temperature drop of the patch with the temperature drop correction unit 115. It should be noted that this process is carried out by the printer 1, and at that time, a special temperature sensor (referred to below as "special temperature sensor"), for measuring the temperature on the medium that has been transported to the position of the color sensor unit 123, needs to be provided separately from the temperature sensor unit 122. A radiation thermometer or the like can be used as the special temperature sensor.

First, in step S1001, the medium (recording paper) serving as the target is provided, and the printer 1 forms a maximized patch which has maximum loading of the coloring sample on that target medium (maximally loaded patch). For this maximally loaded patch, the printer 1 may print a patch in which each of the printable toners, that is, cyan, magenta, yellow and black, is printed at a density of 100%, that is, at a total density of 400%.

Then, in step S1002, the temperature at the position where the maximally loaded patch passes the color sensor unit 123 is measured as the maximally loaded patch temperature Tm by the above-noted special temperature sensor (not shown in the figures). That is to say, the target medium, on which the maximally loaded patch has been printed in step S1001, is transported to the vicinity of the color sensor unit 123, and when the maximally loaded patch passes the color sensor unit 123, the maximally loaded patch temperature Tm is measured by the special temperature sensor.

Next, in step S1003, the temperature of a white portion on the target medium while passing the color sensor unit 123 is measured as the paper white temperature at the colorimetry Tw (at the time the color is measured), by the special temperature sensor (not shown in the figures). Here, the white portion on the target medium corresponds to a paper white patch without coloring sample (that is, a portion of the patch without coloring that is left white).

The temperature sensor unit 122 measures the temperature T0 (paper white temperature at the temperature measurement) when the target medium passes the temperature sensor unit 122. Then, the relation between the temperature T0 (paper white temperature at the temperature measurement) and the temperature Tw (paper white temperature at the colorimetry), and more specifically the temperature difference between the two is calculated as the temperature difference between the sensors.

Figure 5:
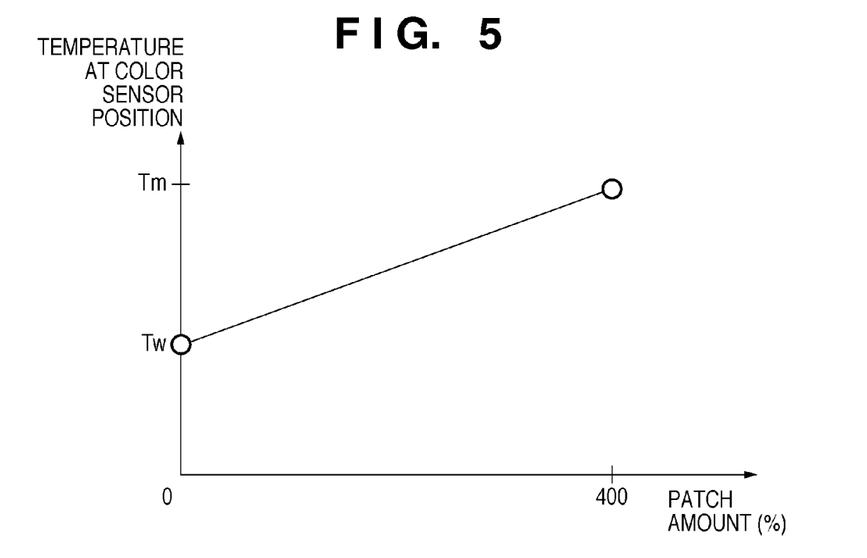
FIG. 5 is a diagram showing the characteristics of the temperature drop table according to this embodiment.

Next, in step S1004, the temperature drop table 1201 shown in FIG. 5 is prepared based on the relation between the maximally loaded patch temperature Tm and the paper white temperature at the colorimetry Tw obtained in steps S1002 and S1003, and the amount of the color sample on the patch (referred to below as "patch amount"). As can be seen in FIG. 5, the temperature of the patch formed on the target medium changes with the patch amount. Assuming that this change is linear, it is possible to estimate the temperature at the time that patch passes the color sensor unit 123 (patch colorimetry temperature), for any patch amount.

The temperature drop table 1201 (FIG. 5) prepared in this manner and the temperature difference between the sensors are looked up whenever the printer 1 according to the present embodiment corrects the patch temperature drop. For this reason, the temperature drop table 1201 is held within the temperature drop correction unit 115, and similarly, also the temperature difference between the sensors is held in a memory (not shown in the figures) within the temperature drop correction unit 115.

Processing for Correcting the Drop of the Patch Temperature

Figure 6:
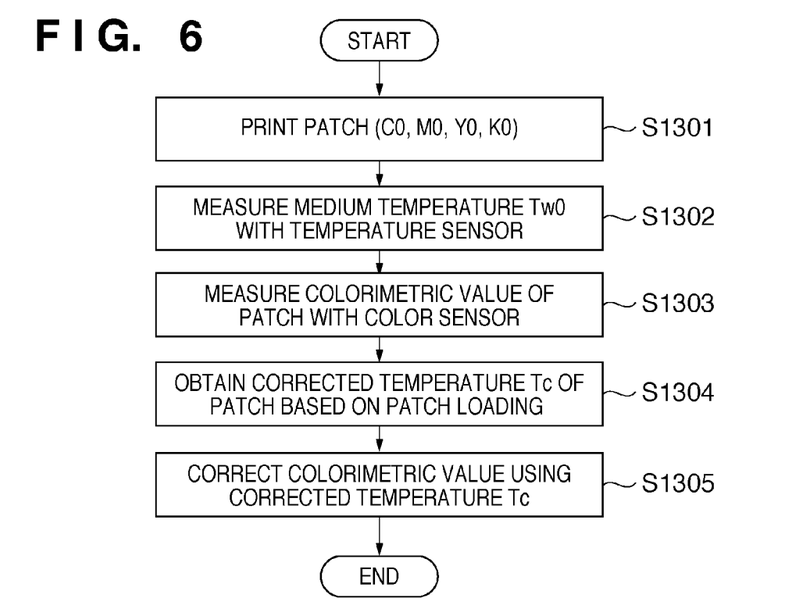
FIG. 6 is a flowchart showing the process of correcting the temperature drop according to this embodiment.

Referring to the flowchart of FIG. 6, the following is an explanation of the processing for correcting the patch temperature drop by looking up the temperature drop table 1201 prepared in the manner described above. It should be noted that FIG. 6 shows the processing by which the temperature drop correction unit 115 corrects the patch temperature drop, as well as the processing by which the colorimetric value correction unit 114 thereafter corrects colorimetric value fluctuations due to temperature.

First, in step S1301, a patch constituted by device color values (C0, M0, Y0, K0) is printed. Here, the printed patch may be of any color, and it is possible to print any patch depending on the purpose.

In the following step S1302, the temperature of a white paper portion on the medium, transported through the fixing unit 121 to the color sensor unit 123 within the engine unit 12, is measured by the temperature sensor unit 122. The temperature that is measured here is the medium paper white temperature Tw0.

In the next step S1303, the color sensor unit 123 within the engine 12 measures the color of the patch and obtains the colorimetric value 1231.

In the next step S1304, the correction amount calculation unit 1202 of the temperature drop correction unit 115 calculates the patch amount, and based on this patch amount, calculates the corrected temperature (patch colorimetry temperature) 1151 of the patch.

First, the total amount PQ (%) indicating the amount of the coloring sample used when forming the patch (C0, M0, Y0, K0) on the medium is calculated with the following Equation (1):

$$PQ = C0 + M0 + Y0 + K0 \qquad (1)$$

Then, based on the temperature drop table shown in FIG. 5 and the temperature difference between the sensors calculated at the time of preparing that table, the corrected temperature Tc (patch colorimetry temperature 1151) for the patch is calculated with the following Equation (2):

$$Tc = Tw0 + (Tm - Tw) \times PQ/400 + (Tw - T0) \qquad (2)$$

The second term on the right in Equation (2), that is, the term $(Tm-Tw) \times PQ/400$ indicates the correction amount depending on the specific heat of the output patch, and the correction of the patch temperature is performed using the temperature drop table shown in FIG. 5. As can be seen from FIG. 11, the value calculated by this second term on the right corresponds to the temperature difference between the patch colorimetry temperature based on the temperature drop table, and the medium paper white temperature Tw0. Consequently, this temperature difference is added to the medium paper white temperature Tw0 of the first term on the right.

The third term on the right in Equation (2), that is, the term (Tw−T0) indicates the temperature difference between the sensors that has already been calculated in the above-noted step S1003. In Equation (2), the correction to the paper white temperature at the position of the color sensor unit 123 is performed by measuring with the temperature sensor unit 122 and adding the temperature difference between the sensors to the medium paper white temperature Tw0.

In the last step S1305, the colorimetric value correction unit 114 performs a colorimetric value correction, in which it corrects the colorimetric value of the patch using this corrected temperature Tc. That is to say, as shown in FIG. 2, the colorimetric value 1231 of the patch obtained in step S1303 is corrected based on the patch colorimetry temperature 1151 (Tc) obtained in step S1304 and the device value (CMYK) 1112 used when printing the patch.

With the present embodiment as explained above, it is possible to suitably correct the colorimetric value of a patch of any color, taking into account the temperature changes from immediately after fixing the patch up to the color sensing. Consequently, since a suitable colorimetric value is obtained, more suitable print processing becomes possible.

It should be noted that a feature of the present invention is that the drop of the patch temperature when the medium is transported immediately after fixing the patch is corrected, so that the method for utilizing the temperature of the patch after the correction is not limited to the example of the present embodiment.

Modified Examples

Other Configurations of the Temperature Sensor

As discussed above, in the present embodiment, the temperature sensor unit 122 measures, as an example, the medium paper white temperature Tw0 at the time of transport, and the temperature is corrected to the temperature of the white paper that would be measured at the color sensor unit 123. It is also possible to estimate the white paper temperature of the medium at the color sensor unit 123 with a configuration using, instead of the temperature sensor unit 122, the atmospheric temperature immediately after the fixing and a temperature sensor that is ordinarily arranged in the fixing roller.

Omitting the Temperature Sensor

Furthermore, in the present embodiment, as an example, the estimation of the patch temperature was carried out by entering a signal into the temperature drop correction unit 115 from the temperature sensor unit 122 every time as the paper white temperature Tw0 of the transported medium. Here, the case is considered that the medium paper white temperature Tw0 measured by the temperature sensor unit 122 is constant, and the maximally loaded patch temperature Tm at the position of the color sensor unit 123 and the paper white temperature Tw at the time of colorimetry are both substantially constant. In this case, the correction equation for obtaining the corrected temperature Tc can be expressed by the following simpler Equation (3):

$$Tc = Tw + (Tm - Tw) \times PQ/400 \qquad (3)$$

Figure 7:
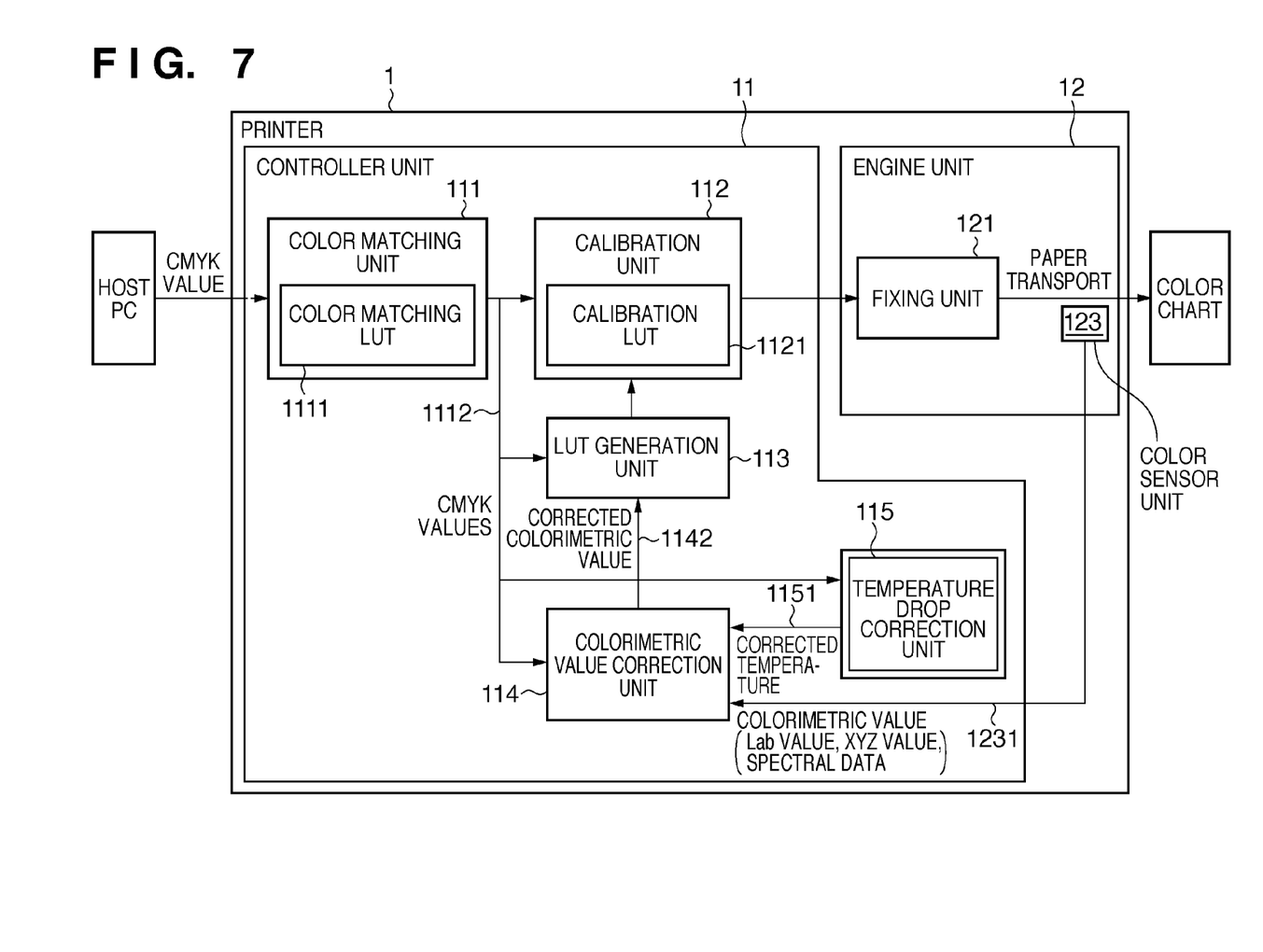
FIG. 7 is a block diagram showing the configuration of a printer according to a modified example of this embodiment.

In this case, a measurement with the temperature sensor unit 122 included in the configuration of the printer 1 shown in FIG. 1 becomes unnecessary, so that the printer 1 can be configured in a simpler manner, as shown in FIG. 7.

Omitting the Temperature Drop Correction Unit

Figure 8:
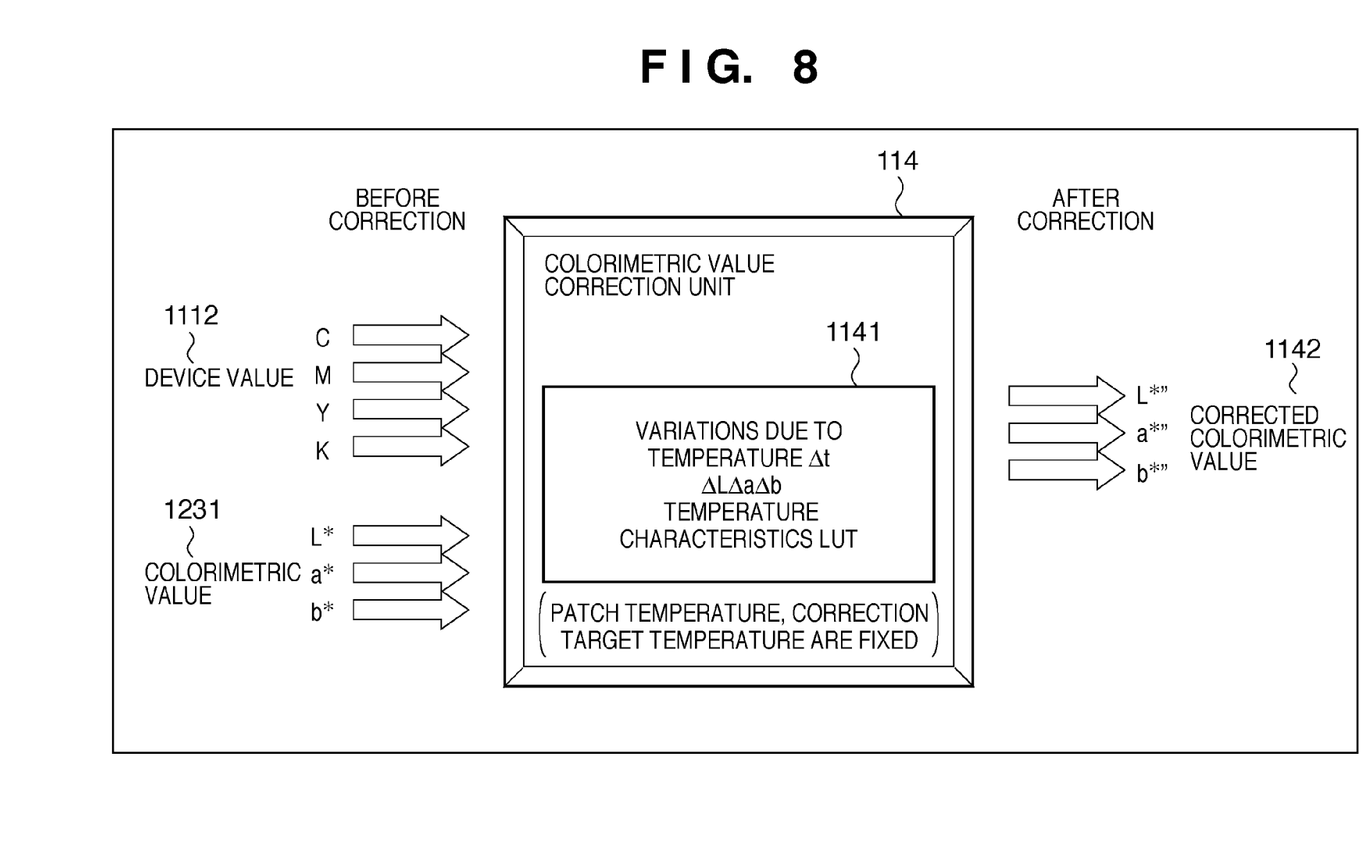
FIG. 8 is a block diagram illustrating a configuration example of the colorimetric value correction unit according to the modified example of this embodiment.
Figure 9:
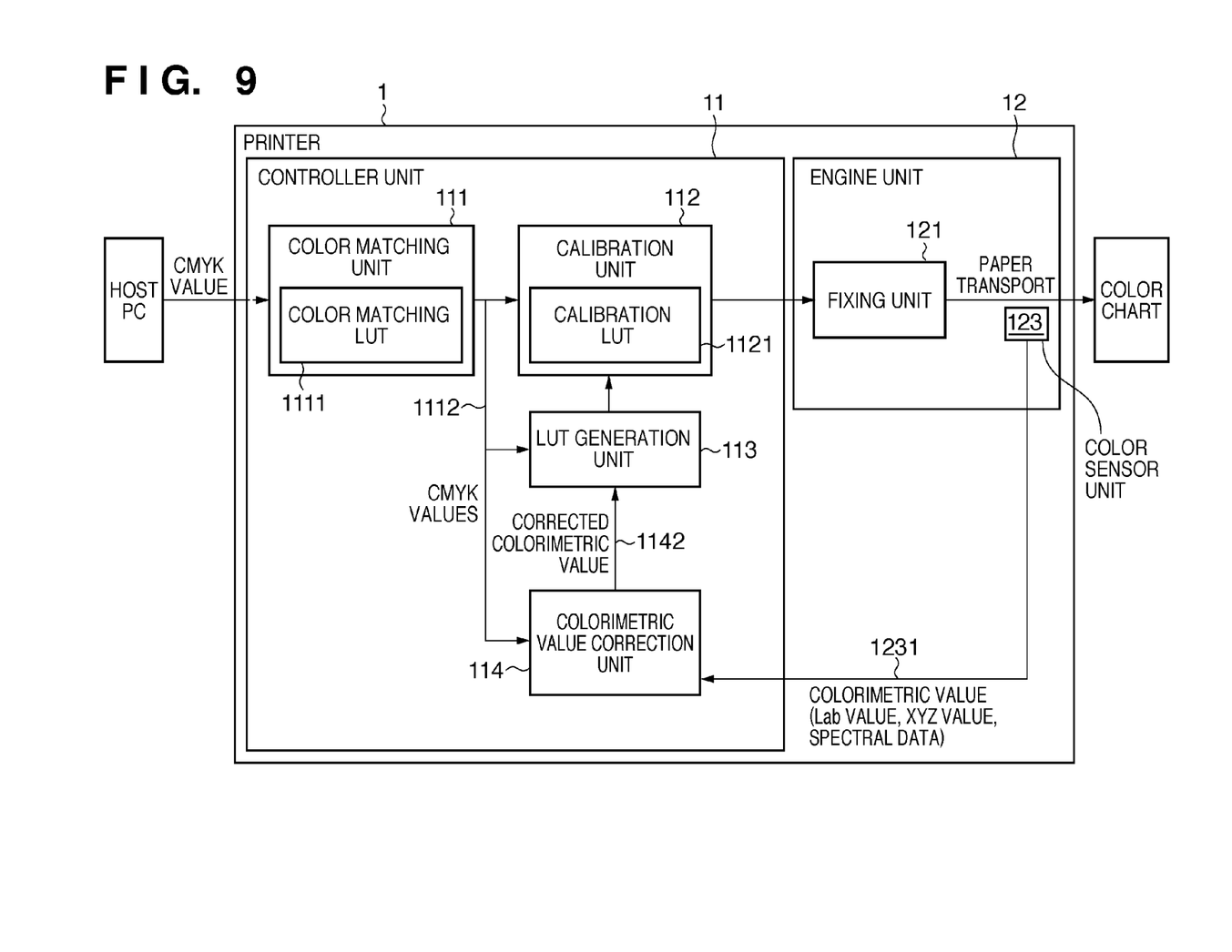
FIG. 9 is a block diagram illustrating the configuration of a printer that does not require a temperature drop correction unit in a modified example of this embodiment.

In the configuration shown in FIG. 7, the corrected temperature Tc according to Equation (3) can be reflected in the temperature characteristics LUT 1141, which is prepared by measuring the variation amount of the colorimetric value due to temperature changes for a plurality of reference patches, held in the colorimetric value correction unit 114 as shown in FIG. 2. That is to say, the results of determining the temperature drop using the above-noted correction equation (3) for a plurality of reference patches can be combined in the temperature characteristics LUT 1141. As a result of this combination, the colorimetric value correction unit 114 operates as shown in FIG. 8, so that the calculation costs for correcting the colorimetric values can be reduced. In this case, the temperature drop correction unit 115 in FIG. 7 becomes unnecessary, so that a simpler configuration can be realized, as shown in FIG. 9.

When the Specific Heat Differs for Each Toner Color

In the above embodiment, a correction was performed with the Correction Equations (1) and (2) using the total amount PQ, which was obtained by adding up the amounts of the individual colors under the assumption that the specific heat per unit weight is the same for each of cyan, magenta, yellow and black toner. However, if the specific heats a, b, c and d per unit amount of the cyan, magenta, yellow and black toner differ, then a patch specific heat amount PE should be calculated instead of the total amount PQ, and the correction should be carried out using this value. That is to say, the correction should be carried out with the following Equations (4) and (5):

$$PE = a \times C0 + b \times M0 + c \times Y0 + d \times K0 \quad (4)$$

$$Tc = Tw0 + (Tm - Tw) \times PE/(a+b+c+d) + (Tw - T0) \quad (5)$$

Other Fixing Methods

In the above-described first embodiment, as an example, the temperature drop due to the paper transport was estimated from the temperature drop of both the maximally loaded patch and the white paper medium (white paper patch), under the assumption that the temperature of the medium is ordinarily uniform immediately after the fixing process by applying heat and pressure.

However, in a system employing another fixing method, such as for example UV fixing, the amount of thermal energy that is absorbed depends on the color of the patch, so that the initial value of the temperature differs, and consequently the patch temperature that is measured at the location of the color sensor unit 123 also depends on the color of the patch.

In this case, the temperature at the location of the color sensor unit 123 can be measured for a number of patches with representative device values (reference patches), and a multidimensional temperature drop table 1201 can be configured having a plurality of device values. Thus, the temperature drop of any patch can be estimated by LUT interpolation with the temperature drop table 1201 in accordance with the device values of the patches.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-058696, filed Mar. 11, 2009, which is hereby incorporated by reference herein in its entirety.

The invention claimed is:

1. An image processing apparatus comprising:
a forming unit configured to form a patch based on patch data on a medium;
a temperature measuring unit configured to measure a temperature of a white paper portion of a medium to obtain a white paper temperature;
a colorimetry unit configured to obtain a colorimetric value by measuring a color of the patch formed on the medium;
an estimation unit configured to estimate a colorimetry temperature, which is a temperature of the patch at a time when the colorimetry unit measures its color, based on the patch data and the white paper temperature; and
a correction unit configured to correct the colorimetric value based on the estimated colorimetry temperature.

2. The image processing apparatus according to claim 1, wherein the estimation unit is further configured to estimate the colorimetry temperature based on a table indicating colorimetry temperatures for a plurality of patches; and
the table is prepared based on the temperatures of the plurality of the patches at the time of colorimetry, which are measured by a sensor when the media pass the colorimetry unit, wherein the plurality of patches are formed on the media by the forming unit based on the data for the plurality of patches, and wherein the sensor is different from the temperature measurement unit.

3. The image processing apparatus according to claim 2, wherein the plurality of patches formed when preparing the table include a patch in which the amount of the coloring sample is maximal and a white paper patch on which no coloring sample is loaded.

4. The image processing apparatus according to claim 3, wherein the estimation unit is further configured to:
calculate the temperature difference between the colorimetry temperature and the white paper temperature of the patch based on the table; and
calculate the colorimetry temperature by adding the temperature difference to the white paper temperature.

5. The image processing apparatus according to claim 4, wherein the estimation unit is further configured to:
calculate the amount of the coloring sample that is used when the forming unit forms the patch based on the patch data; and
calculate the temperature difference based on this amount.

6. The image processing apparatus according to claim 4, wherein the estimation unit is further configured to:
calculate a specific heat amount of the patch based on the patch data; and
calculate the temperature difference based on this specific heat amount.

7. The image processing apparatus according to claim 4, wherein the estimation unit is further configured to:
add to the white paper temperature, the difference between the temperature of the white paper patch at the time of colorimetry that is measured when the table is formed, and the temperature of the white paper patch that is measured by the temperature measurement unit when the table is formed.

8. The image processing apparatus according to claim 1, wherein the correction unit is further configured to estimate the colorimetric value obtained by measuring the color of the patch formed on the medium at a predetermined temperature, based on the patch data, the colorimetric value and the colorimetry temperature.

9. A color processing method for an image processing apparatus comprising a forming unit for forming a patch on a medium, a temperature measuring unit for measuring a temperature of a formed patch, and a colorimetry unit for measuring a color of a patch, the method comprising:
a forming step of forming, with a forming unit, a patch based on patch data on a medium;
a temperature measuring step of measuring, with a temperature measuring unit, a temperature of a white paper portion of the medium to obtain a white paper temperature;

a colorimetry step of obtaining, with a colorimetry unit, a colorimetric value by measuring a color of the patch formed on the medium;

an estimation step of estimating a colorimetry temperature, which is a temperature of the patch at a time when its color is measured with the colorimetry unit, the estimation being based on the patch data and the white paper temperature; and a colorimetric value correction step of correcting the colorimetric value based on the estimated colorimetry temperature.

10. The color processing method according to claim 9, wherein, in the estimation step, the colorimetry temperature is estimated based on a table indicating colorimetry temperatures for a plurality of patches; and the table is prepared based on the temperatures of the plurality of the patches at the time of colorimetry, which are measured by a sensor when the media pass the colorimetry unit, wherein the plurality of patches are formed on the media by the forming unit, based on the data for the plurality of patches, and wherein the sensor is different from the temperature measurement unit.

11. A non-transitory computer-readable storage medium storing a program for controlling a computer to perform the steps in the color processing method according to claim 9.

* * * * *